(12) United States Patent
Huang et al.

(10) Patent No.: US 8,400,902 B2
(45) Date of Patent: Mar. 19, 2013

(54) OPTICAL WAVEGUIDE CLAD MATERIAL

(75) Inventors: Xiaoyue Huang, Eden Prairie, MN (US); Michael Christopher Kautzky, Eagan, MN (US); Amit Itagi, Eden Prairie, MN (US); William Albert Challener, Glenville, NY (US); Michael Allen Seigler, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 13/370,367

(22) Filed: Feb. 10, 2012

(65) Prior Publication Data

US 2012/0140609 A1 Jun. 7, 2012

Related U.S. Application Data

(63) Continuation of application No. 13/032,772, filed on Feb. 23, 2011, now Pat. No. 8,149,657.

(60) Provisional application No. 61/307,139, filed on Feb. 23, 2010.

(51) Int. Cl.
*G11B 7/00* (2006.01)
*G11B 7/135* (2006.01)

(52) U.S. Cl. .................................. 369/112.27

(58) Field of Classification Search ............... 369/44.12, 369/112.27, 44.11; 385/124, 144, 142; 360/125.4, 360/125.1, 59; 117/86
See application file for complete search history.

(56) References Cited

U.S. PATENT DOCUMENTS

| | | | |
|---|---|---|---|
| 3,563,630 A | 2/1971 | Anderson | |
| 5,113,472 A | 5/1992 | Gualtieri | |
| 7,292,766 B2 | 11/2007 | Anderson | |
| 7,582,161 B2 * | 9/2009 | Ahn et al. | 117/86 |
| 8,023,225 B2 | 9/2011 | Shimazawa | |
| 2009/0052076 A1 | 2/2009 | Shimazawa | |
| 2010/0214685 A1 | 8/2010 | Seigler | |

OTHER PUBLICATIONS

W.Y. Ching et al., "Electronic and Optical Properties of Y2SiO5 and Y2Si2O7 With Comparisons to α-SiO2 and Y2O3", Physical Review B 67 (2003), pp. 245108-1-245108-8.

* cited by examiner

*Primary Examiner* — Nabil Hindi
(74) *Attorney, Agent, or Firm* — Mueting Raasch & Gebhardt P.A.

(57) ABSTRACT

An apparatus includes a waveguide having a core layer and first and second cladding layers on opposite sides of the core layer, wherein the cladding layers comprise a binary oxide composition. In another example, the cladding layers include a ternary or quaternary combination of oxides and/or oxynitrides. In another example, the cladding layers include a silicon oxynitride.

20 Claims, 4 Drawing Sheets

OPTICAL WAVEGUIDE CLAD MATERIAL

CROSS REFERENCE TO RELATED APPLICATION

This application is a continuation of U.S. application Ser. No. 13/032,772 filed Feb. 23, 2011, now allowed, and which claims the benefit of U.S. Provisional Patent Application Ser. No. 61/307,139, filed Feb. 23, 2010, and titled "Hydrothermal Corrosion Resistant Optical Waveguide Clad Material", which applications are hereby incorporated by reference.

BACKGROUND

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

In one example of a heat-assisted magnetic recording head, an optical planar waveguide is used to deliver light from a remote source to the air-bearing surface (ABS) of the head where it is used to either heat the media directly (e.g. using a solid immersion mirror type HAMR) or stimulate a near-field transducer (NFT) into resonance for heating of the recording medium. The planar waveguide includes a high-index core layer sandwiched between two low-optical index clad layers.

The clad layers are made from $Al_2O_3$ and the core layer from $Ta_2O_5$. During operation the ABS environment around the waveguide, NFT, and write pole is exposed to temperatures up to 500° C. and air bearing pressures up to 25 atm. In addition the extreme localized heating is believed to generate superheated water vapor from air humidity and material outgassing.

SUMMARY

In one aspect, an apparatus includes a waveguide having a core layer and first and second cladding layers on opposite sides of the core layer, wherein the cladding layers include a binary oxide composition.

In another aspect, an apparatus includes a waveguide having a core layer and first and second cladding layers on opposite sides of the core layer, wherein the cladding layers include a ternary or quaternary combination of oxides and/or oxynitrides.

In another aspect, an apparatus includes a waveguide including a core layer and first and second cladding layers on opposite sides of the core layer, wherein the cladding layers comprise $Y_2O_3$, and a near field transducer is embedded in the first cladding layer.

These and other features and advantages which characterize the various embodiments of the present disclosure can be understood in view of the following detailed discussion and the accompanying drawings.

DETAILED DESCRIPTION OF THE INVENTION

Figure 1:
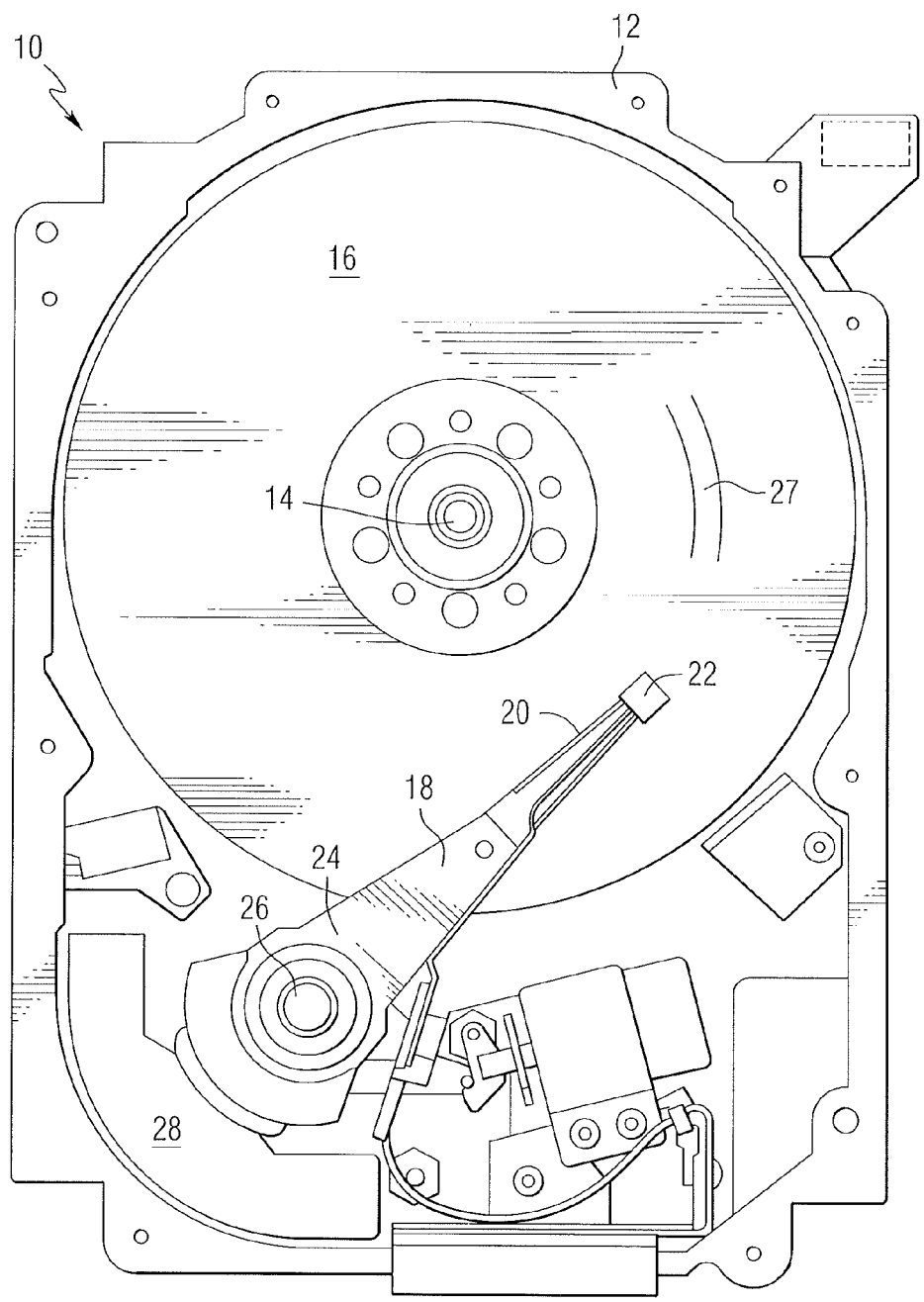
FIG. 1 is a pictorial representation of a data storage device in the form of a disc drive that can include a transducer in accordance with an embodiment.

FIG. 1 is a pictorial representation of a data storage device in the form of a disc drive 10 that can utilize a recording head having a waveguide. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a predetermined track 27 of the disc 16. The actuator motor 28 is regulated by a controller, which is not shown in this view.

For heat assisted magnetic recording (HAMR), electromagnetic radiation, for example, visible, infrared or ultraviolet light is directed onto a surface of the recording media to raise the temperature of a localized area of the media to facilitate switching of the magnetization of the area. Some designs of HAMR recording heads include a thin film waveguide to guide light to the recording media for localized heating of the recording media. A near-field transducer can be positioned at the air bearing surface of a recording head to direct the electromagnetic radiation to a small spot on the recording media.

Figure 2:
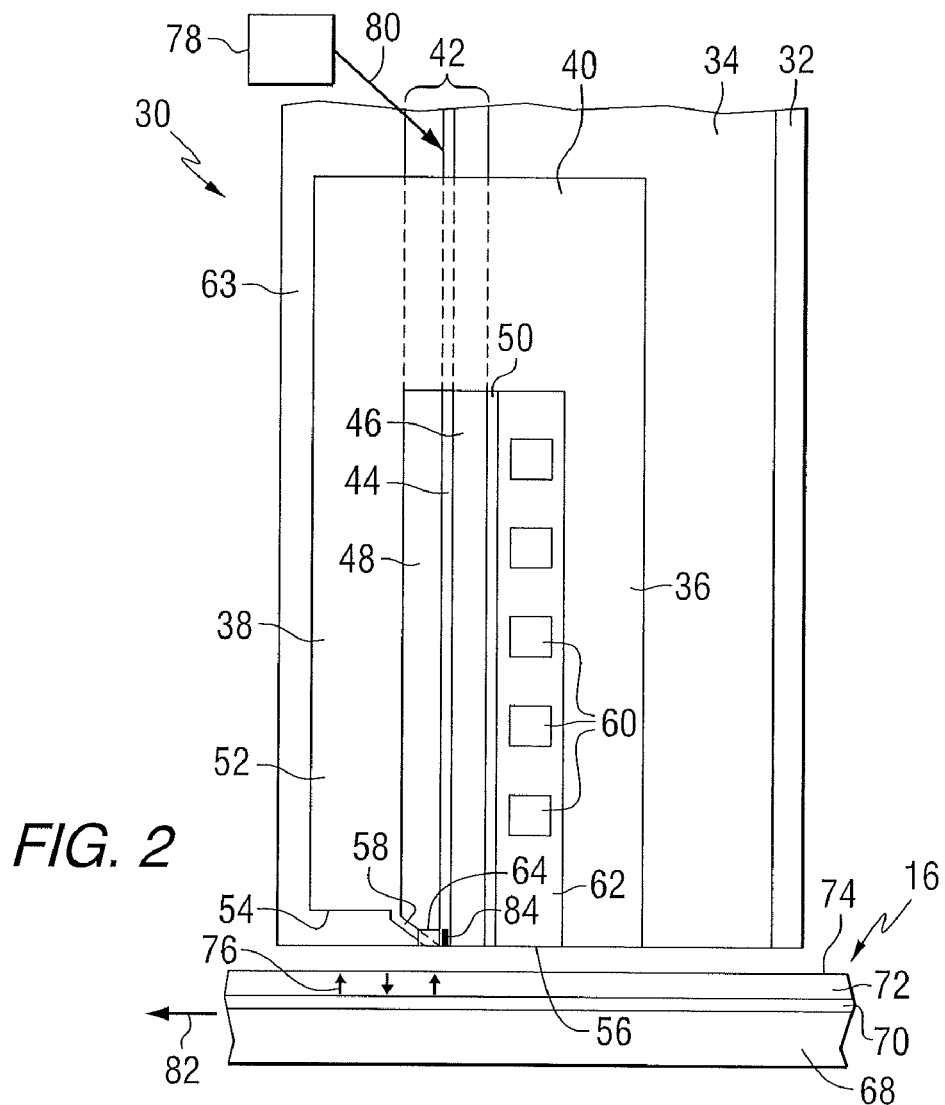
FIG. 2 is a cross-sectional view of a recording head for use in heat assisted magnetic recording.

FIG. 2 is a cross-sectional view of portions of an example recording head for use in heat assisted magnetic recording. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. While this example includes a planar coil, other types of coils, such as a helical coil, could be used. A helical coil would wrap around the bottom/return pole. In alternative embodiments, the planar coil could be positioned between the waveguide and the top pole. In this example, the top pole serves as a write pole and the bottom pole serves as a return pole. In addition, an actual recording head would include other structures such as a read element.

An insulating material 62 separates the coil turns. In one example, the substrate can be AlTiC, the core layer can be $Ta_2O_5$, and the cladding layers can be the materials described below. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field to the storage media 16. The media 16 includes a substrate 68, a heat sink layer 70, a magnetic recording layer 72, and a protective layer 74. A magnetic field produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. For example, the light source 78 may work in combination with an optical fiber and external optics for collimating the light beam 80 from the optical fiber toward a diffraction grating on the waveguide. Alternatively, a laser may be mounted on the waveguide 42 and the light beam 86 may be directly coupled into the waveguide 42 without external optical configurations. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82.

Although the example of FIG. 2 shows a perpendicular magnetic recording head and a perpendicular magnetic storage media, it will be appreciated that the embodiments may also be used in conjunction with other types of recording heads and/or storage media where it may be useful to employ heat assisted recording.

In an example recording head having a $Ta_2O_5$ core layer, suitable materials for durable clad layers have the following specifications: (1) refractive index (n)<1.90 at 800-900 nm wavelength; (2) optical loss (L)<50 dB/cm in order to deliver acceptable amount of light from source to ABS with existing HAMR waveguide structure; (3) mechanical properties matched to device specifications, including slice/lap compatibility, moderate to high CTE, and good adhesion with core, mirror, and NFT layers; and (4) long-term durability against the temperature/pressure conditions listed above. However, is should be understood that the core layer material is not limited to $Ta_2O_5$. In general, the core layer can be a low loss material with a refractive index of 2.0 or more.

General classes of optical waveguide materials for visible and near-infrared range wavelength are metal oxides, fluorides, and nitrides. As almost all metal fluorides and most metal nitrides have either poor resistance to humidity due to high solubility in water, or suffer from lack of robust wafer-level thin film manufacturing methods, oxides and selected oxynitrides are used in the examples described below.

Figure 3:
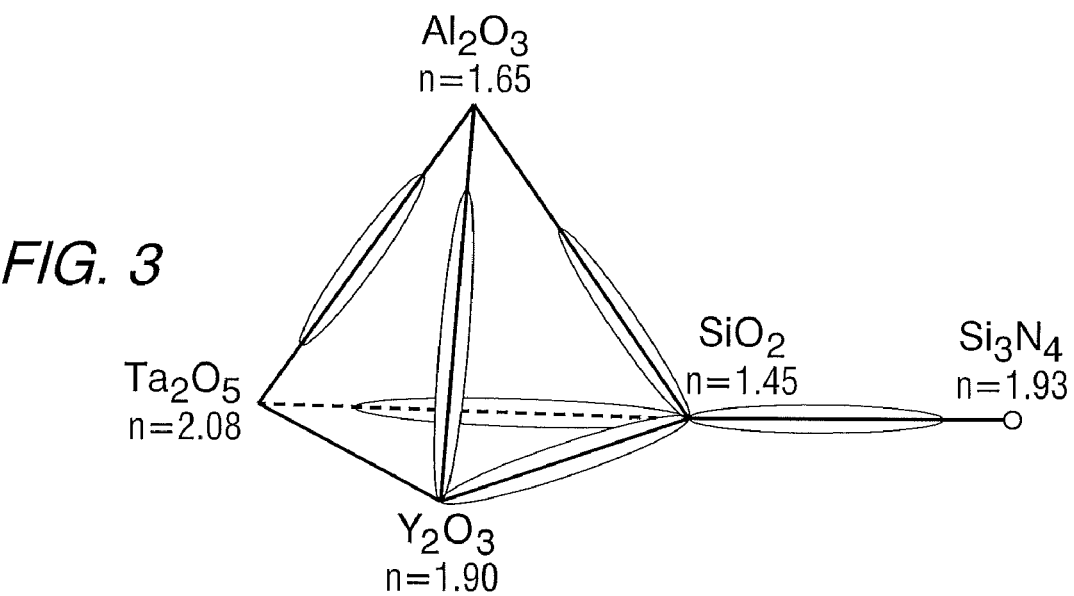
FIG. 3 is a schematic representation of a composition tetrahedron for various cladding compositions.

Clad materials that may be used in various embodiments have been developed from the system of oxides and nitrides shown in FIG. 3. This system is represented pictorially by a composition tetrahedron with terminal oxides $Al_2O_3$, $Ta_2O_5$, $Y_2O_3$, and $SiO_2$ at the corners. Compositions along sides of the tetrahedron represent binary mixed oxides of the compounds at the two ends of that side; compositions on faces of the tetrahedron represent ternary oxides of the compounds at the three corners of the face; and compositions in the interior of the tetrahedron represent quaternary oxides of all four terminal compounds. An additional segment showing binary oxynitrides in the $SiO_2$—$Si_3N_4$ system is also included. Single oxides and composition ranges for binary mixtures are shown by the ellipses in FIG. 3.

In one embodiment, unary oxides are used as cladding materials. Oxides of yttrium and silicon have durable hydrothermal behavior under the 10 minute boiling water immersion and 8 hours/17 atm/100% humidity/200° C. Exposure test results show: (1) no surface morphology change under atomic force microscopy (AFM); (2) no optical loss and index change by prism coupler measurement. In addition these compounds satisfy the index, loss, and mechanical property specifications, as shown in Table I.

TABLE I

Film properties of $Y_2O_3$ and $SiO_2$.

| Film Properties | Unit | Material | |
|---|---|---|---|
| | | $Y_2O_3$ | $SiO_2$ |
| Material/Composition | | | |
| Film growth method | | RF sputtering | RF sputtering |
| Microstructure | Nm | primary [222] | amorphous |
| Roughness | nm RMS (5 μm × 5 μm) | <1.5 | n/a |
| Refractive Index | | 1.87~1.90 | 1.47 |
| Thermal conductivity | W/m/K | 1.5 | 1.2 |
| Optical Loss | dB/cm | <5 dB/cm | <10 dB/cm |
| CTE | 10E-6/° C. | 5.7 | 0.8 |
| Film Stress | |MPa| | −200~−600 | n/a |

In another embodiment, binary oxides are used as cladding materials. Binary oxides include, for example, combinations of a metal oxide ($MeO_x$) and $AlO_x$, where $MeO_x$ is a high refractive index (n) material, and wherein $0<x<3.0$, e.g. $x=1$, 1.5, 2, 2.5. Metal elements with high-n, low-loss oxides include Ti, Hf, Zr, Nb, and Ta. Of these, Ta is used for its hydrothermal corrosion resistance and compatibility with many wafer-level deposition schemes. The useful composition range for the binary oxide is limited on the high-n oxide-rich side by the n<1.90 specification, and on the $AlO_x$-rich side by the maximum amount of $AlO_x$ that can be included without incurring hydrothermal corrosion. For the purposes of this description, a high index of refraction is considered to be an index of refraction greater than about 2.0.

Binary oxides can also include combinations of $Y_2O_3$ and $AlO_x$. The range of durable clad materials in this system extends from the $Y_2O_3$ terminus in FIG. 3 to moderately $AlO_x$-rich compositions such as the common stable compound YAG ($Y_3Al_5O_{12}$) with index of 1.66.

Figure 4:
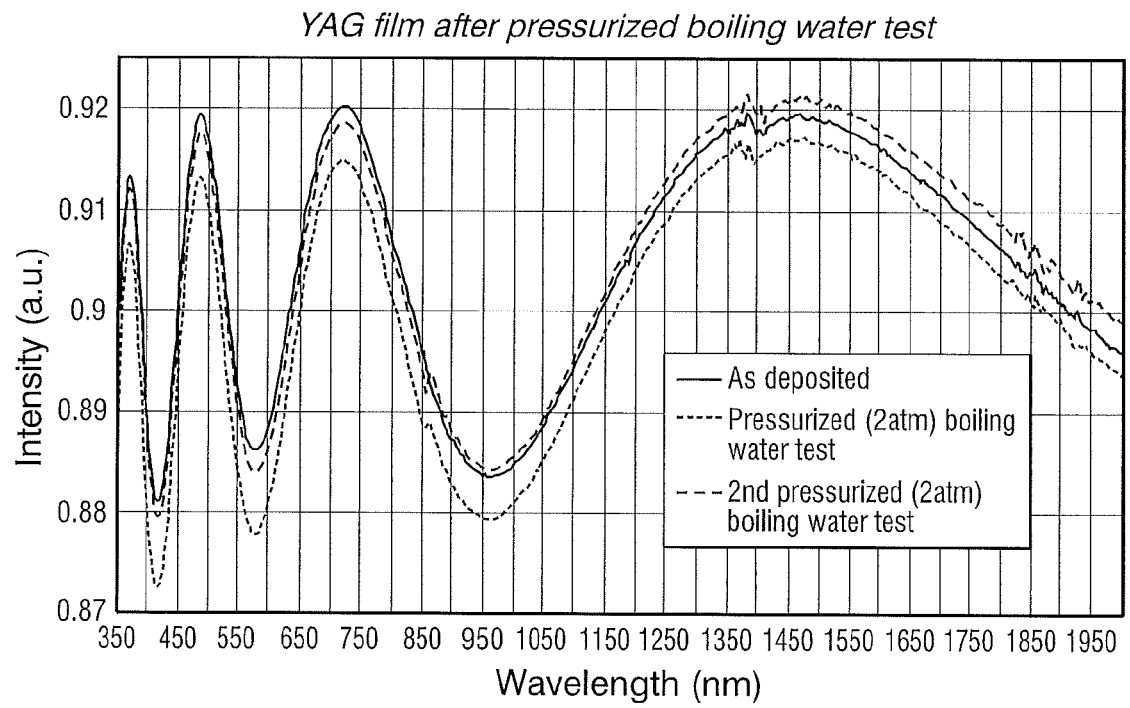
FIGS. 4 and 5 are graphs of intensity versus wavelength.

FIG. 4 shows that YAG film optical spectra remains intact after two pressurized high temperature steam tests. The data illustrated in FIG. 4 indicates that YAG films have no change in their index of refraction (n) and extinction coefficient (k) after 1 hour exposures to pressurized high temperature steam (5 psi over atm).

Figure 5:
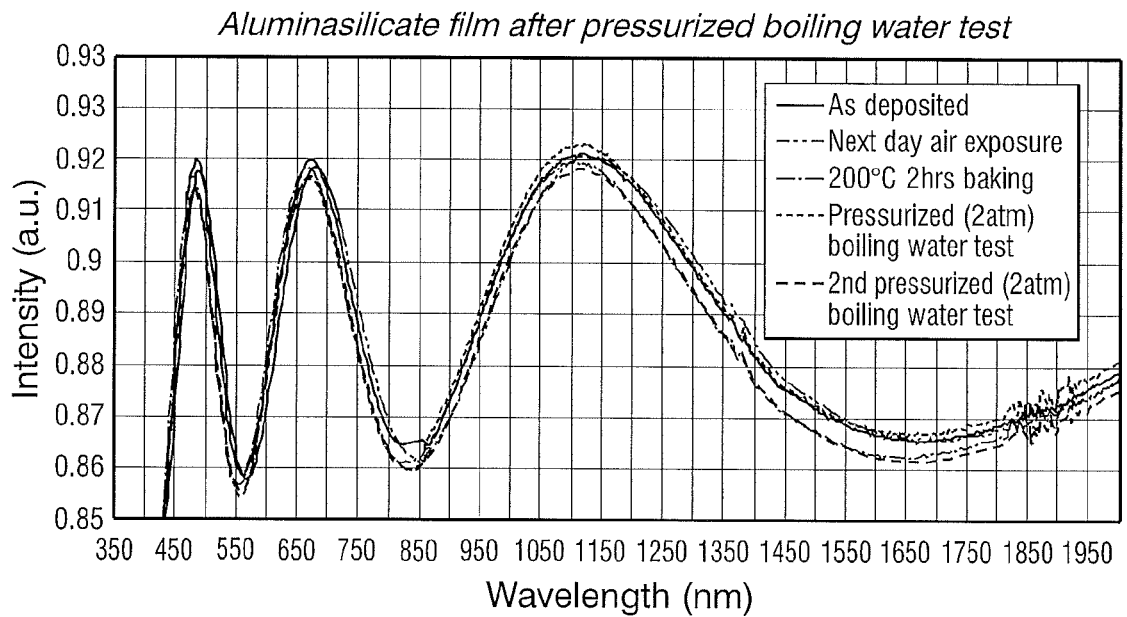

Binary oxides can also include combinations of $SiO_2$ and $Al_2O_3$. The range of durable clad materials in this system extends from the $SiO_2$ terminus in FIG. 3 to moderately $AlO_x$-rich compositions such as aluminosilicates. The common stable compounds include $Al_2SiO_5$ and man-made coating material with less than 10% $Al_2O_3$ doped $SiO_2$ (index <1.50). FIG. 5 shows that the aluminosilicate film optical spectra remains intact after 2 times pressurized boiling water tests. The data illustrated in FIG. 5 indicates that 7% wt $Al_2O_3$ doped $SiO_2$ films have no change in their n and k after 1 hour exposures to pressurized high temperature steam (5 psi over atm).

Binary oxides can also include combinations of $Y_2O_3$ and $SiO_2$. In principle, hydrothermal corrosion resistance is expected to exist across this entire range due to durability of the two constituent compounds. In practice, compositions Y-oxyorthosilicate $Y_2SiO_5$ ($SiO_2+Y_2O_3$) and Y-pyrosilicate $Y_2Si_2O_7$ ($2SiO_2+Y_2O_3$) are unique compounds that can form stable phase boundaries. Their refractive indices are estimated to be 1.76 and 1.85 respectively.

Binary oxides can also include combinations of $MeO_x$ and $SiO_2$, where $MeO_x$ is a high refractive index material. Me elements with high-n, low-loss oxides include Ti, Hf, Zr, Nb, and Ta. Of these, Ta is useful for its hydrothermal corrosion resistance and compatibility with many wafer-level deposition schemes. The useful composition range for this binary oxide is limited on the high-n oxide-rich side by the n<1.90 specification.

In another embodiment, the cladding materials can include silicon oxynitrides. Oxynitrides of silicon have durable hydrothermal behavior under the specified conditions. Boiling water immersion has been performed on $SiO_xN_y$ material with no surface degradation on optical properties change afterwards. Optimized durability of $SiO_xN_y$ has also been verified in full device builds incorporate $SiO_xN_y$ as HAMR top cladding material. In one test, a top cladding made of $SiO_xN_y$ remained intact after 1 million HAMR writing cycles. In this example, x can range from 0 to about 2.0, and y can range from 0 to about 1.33.

The useful composition range for this oxynitride is limited on the high-n nitride-rich side by the n<1.90 specification. In addition these compounds satisfy the index, loss, and mechanical property specifications, as shown in Table II.

TABLE II

Film properties of SiOxNy.

| Film Properties | Unit | Material |
|---|---|---|
| Material/Composition | | SiOxNy |
| Film growth method | | RF sputtering or PECVD |
| Microstructure | Nm | Amorphous |
| Roughness | Nm RMS (5 μm × 5 μm) | 2.0 |
| Refractive Index | | 1.60-1.80 |
| Thermal conductivity | W/m/K | 1 |
| Optical Loss | dB/cm | <15 dB/cm |
| CTE | 10E-6/° C. | 2.1-2.5 |
| Film Stress | |MPa| | −200-−300 |

In addition, it is understood that additional embodiments utilizing ternary and quaternary oxides or oxynitrides from the constituents described above are possible.

Deposition for the materials above can be done using a variety of methods including:
1. RF sputtering
2. Reactive sputtering (DC, mid-frequency AC, or RF)
3. Multi-target co-sputtering (RF or reactive)
4. Evaporation (single source or co-evaporation, possibly with supplementary $O_2$)
5. Chemical vapor deposition
6. Atomic layer deposition
7. Ion beam deposition (possibly with supplementary $O_2$)
8. Pulsed laser deposition In one aspect of the disclosure, the entire clad layer can be made of durable materials. For example, the whole cladding may be comprised of materials described above with a refractive index less than 1.68. These materials include $SiO_xN_y$, $MeO_x$—$SiO_2$, $Al_2O_3$—$SiO_2$, $Al_2O_3$—$Y_2O_3$ (YAG).

In another aspect of the disclosure, the durable materials can be used for thin layers in susceptible areas around a NFT. For example, less than 100 nm of durable clad material can be used to surround a NFT to protect the susceptible areas on NFT type HAMR recording. The NFT would be encapsulated in the durable clad material, except at the peg end that extends out at the ABS.

Figure 6:
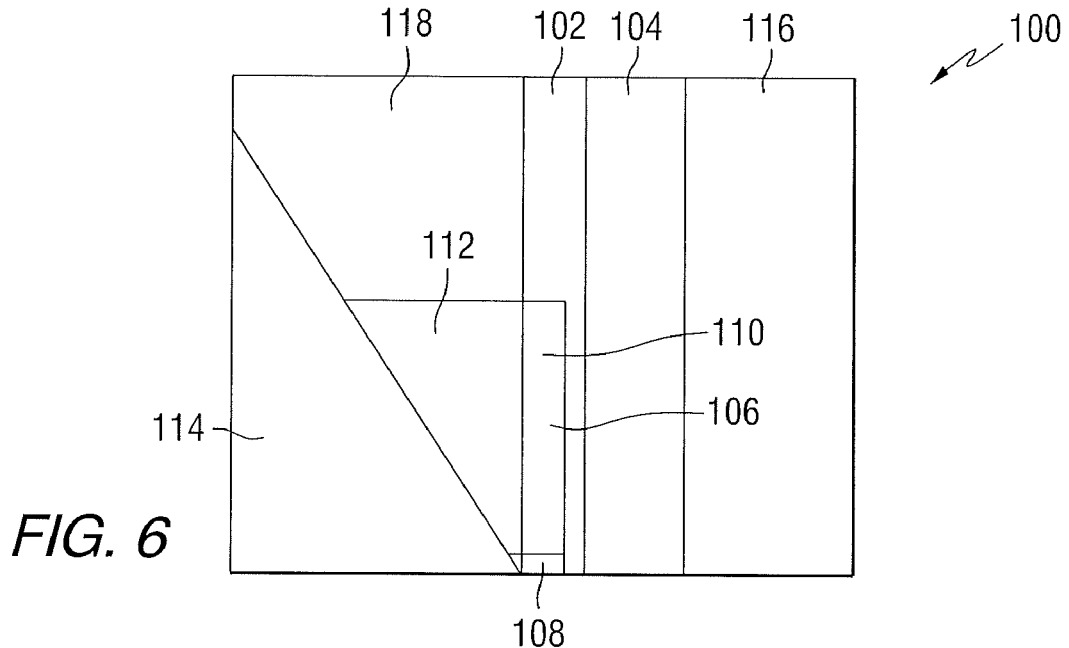
FIG. 6 is an enlarged view of a portion of a recording head.
Figure 7:
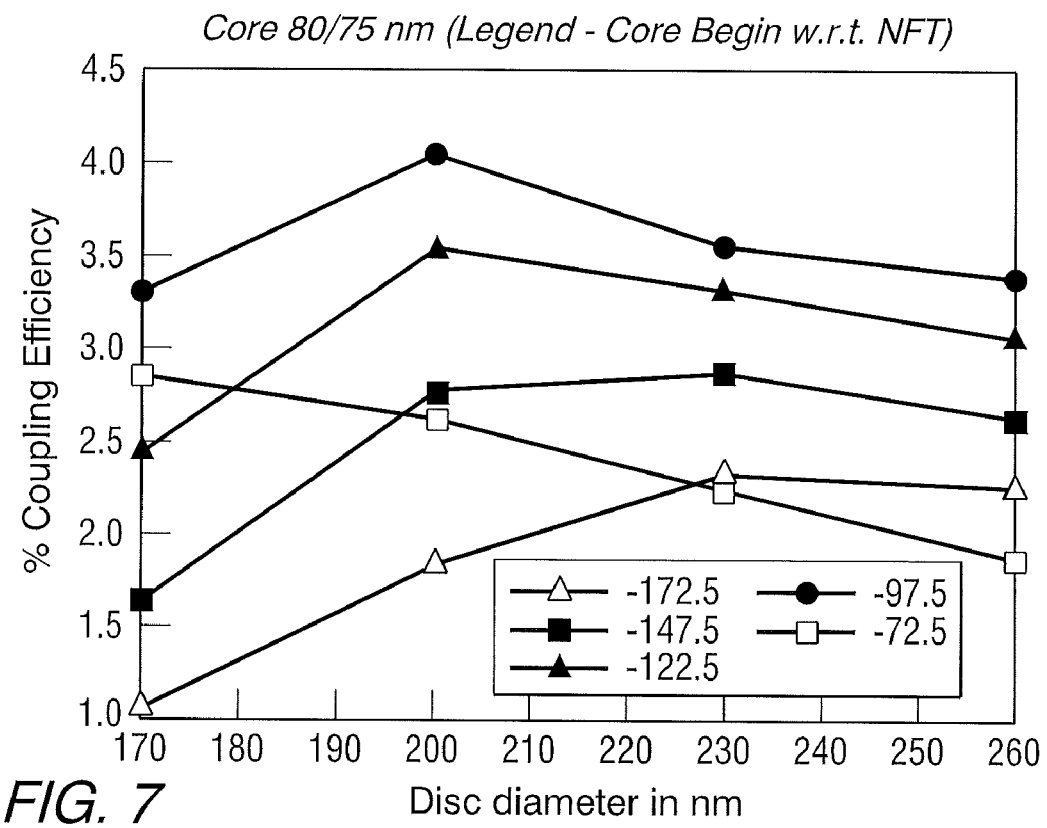
FIG. 7 is a graph of coupling efficiency versus disc diameter.

FIG. 6 is an enlarged view of a portion of a recording head 100 with 75 nm $Y_2O_3$ (n=1.90) used to form a partial waveguide cladding 102 over a $Ta_2O_5$ core 104 with a NFT 106 having a gold peg 108 and disc 110 in the $Y_2O_3$ layer to protect the NFT peg. A heat sink 112 extends between the disc and a magnetic pole 114. Additional cladding layers 116 and 118 are positioned on opposite sides of the core layer. The coefficient of thermal expansion is the same as traditional NFT structure (~4%) as determined by modeling. FIG. 7 shows NFT coupling efficiency modeling based on core thickness and disc diameter changes. In this structure, the materials can also include $(Y_2O_3)_x$—$(SiO_2)_y$, wherein 0<x<1, 0<y<1, and x+y=1, $Y_2SiO_5$, $Y_2Si_2O_7$, $MeO_x$—$SiO_2$, or $MeO_x$—$Al_2O_3$. The partial cladding should extend at least as far from the ABS as the NFT.

For a laser-in-slider HAMR configuration, a coupler layer is used for laser diode light mode coupling into core layer. In one example, the coupler layer's refractive index is in the range of 1.70-1.75 for a structure composed of a 2.08 index core and a 1.65 index background $Al_2O_3$. The background refers to the whole waveguide region, except the core and coupler layers in the middle. The 1.65 index $Al_2O_3$ serves as the lowest index part in the waveguide to confine the light in the coupler and core layers.

For fabrication simplicity, this coupler layer can extend to the ABS at the bottom cladding side. The durable clad materials with a 1.70-1.75 index described above may be used in this configuration. These materials include $SiO_xN_y$, $MeO_x$—SiO2, $MeO_x$—$Al_2O_3$, $Y_2O_3$—$Al_2O_3$ and $Y_2O_3$—$SiO_2$. The coupler layer plays a role in the laser-in-slider to focus large optical spot size from the laser source 78 to the core layer 44, as shown in FIG. 2. It should extend from integrated laser source emitting facet away from the ABS and down to the ABS.

While the invention has been described in terms of several examples, it will be apparent to those skilled in the art that various changes can be made to the described examples without departing from the scope of the following claims. The implementation described above and other implementations are within the scope of the following claims.

What is claimed is:

1. A waveguide comprising:
   a core layer; and
   cladding layers, wherein the cladding layers comprise a binary oxide or a binary oxynitride having an index of refraction of not more than about 1.9.

2. The waveguide according to claim 1, wherein the binary oxide or binary oxynitride has an index of refraction of not more than 1.68.

3. The waveguide according to claim 1, wherein the binary oxide is selected from a binary oxide of $Y_2O_3$ and $Al_2O_3$; a binary oxide of $Al_2O_3$ and $SiO_2$; or a binary oxide of a metal oxide ($MeO_x$) and $AlO_x$.

4. The waveguide according to claim 3, wherein the metal, Me, is selected from Ti, Hf, Zr, Nb, and Ta; and 0<x<3.0.

5. The waveguide according to claim 4, wherein the metal, Me is Ta.

6. The waveguide according to claim 3, wherein the binary oxide is a binary oxide of $Al_2O_3$ and $SiO_2$ and the binary oxide comprises less than 10% $Al_2O_3$.

7. The waveguide according to claim 3, wherein the binary oxide is a binary oxide of $Al_2O_3$ and $SiO_2$ and the binary oxide comprises about 7% $Al_2O_3$.

8. The waveguide according to claim 1, wherein the binary oxynitride comprises SiOxNy.

9. An apparatus comprising:
a waveguide comprising:
a core layer;
a partial cladding layer, the partial cladding layer comprising a binary oxide or a binary oxynitride having an index of refraction of not more than about 1.9;
a first cladding layer; and
a second cladding layer;
a near field transducer (NFT) comprising:
a disc; and
a peg,
wherein the NFT is within the partial cladding layer.

10. The apparatus according to claim 9, wherein the partial cladding layer has a thickness of less than about 100 nm.

11. The apparatus according to claim 9, wherein the partial cladding layer comprises $(Y_2O_3)_x$—$(SiO_2)_y$, wherein $0<x<1$, $0<y<1$, and $x+y=1$, $Y_2SiO_5$, $Y_2Si_2O_7$, $MeO_x$—$SiO_2$, or $MeO_x$—$Al_2O_3$.

12. The apparatus according to claim 9, wherein the peg of the NFT comprises gold.

13. A recording head comprising:
a waveguide comprising:
a core layer; and
cladding layers, wherein the cladding layers comprise a binary oxide or a binary oxynitride having an index of refraction of not more than about 1.9;
a near field transducer (NFT); and
an electromagnetic radiation source,
wherein the waveguide conducts electromagnetic radiation from the electromagnetic radiation source to the NFT.

14. The recording head according to claim 13, wherein the electromagnetic radiation is ultraviolet radiation, infrared radiation, or visible light radiation.

15. The recording head according to claim 13, wherein the electromagnetic radiation is a laser diode.

16. The recording head according to claim 13, wherein the binary oxide or binary oxynitride has an index of refraction of not more than 1.68.

17. The recording head according to claim 13, wherein the binary oxide is selected from a binary oxide of $Y_2O_3$ and $Al_2O_3$; a binary oxide of $Al_2O_3$ and $SiO_2$; or a binary oxide of a metal oxide ($MeO_x$) and $AlO_x$.

18. The recording head according to claim 17, wherein the metal, Me, is selected from Ti, Hf, Zr, Nb, and Ta; and $0<x<3.0$.

19. The recording head according to claim 13 further comprising a coupler layer that functions to couple the electromagnetic radiation from the electromagnetic radiation source into the core layer of the waveguide.

20. The recording head according to claim 19, wherein the coupler layer comprises $SiO_xN_y$; $MeO_x$—$SiO_2$, wherein the metal, Me, is selected from Ti, Hf, Zr, Nb, and Ta, and $0<x<3.0$; $MeO_x$—$Al_2O_3$, wherein the metal, Me, is selected from Ti, Hf, Zr, Nb, and Ta, and $0<x<3.0$; $Y_2O_3$—$Al_2O_3$; or $Y_2O_3$—$SiO_2$.

* * * * *